May 27, 1930.  W. A. CHRYST  1,759,888

SHOCK ABSORBER

Filed Nov. 18, 1927

Inventor
William A. Chryst
Spencer, Hardman and Fehr
his Attorneys

Patented May 27, 1930

1,759,888

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed November 18, 1927. Serial No. 234,113.

This invention relates to improvements in shock absorbers for checking the movement of two relatively movable members, for example the frame and axle of an automotive vehicle.

It is among the objects of the present invention to provide a shock absorber of simple and compact construction for resisting the approaching movement of the frame and axle as well as retarding the movement of separation of these members.

Further objects and advantages of the present invention will be apparent from the following description, reference being had to the accompanying drawings, wherein a preferred embodiment of one form of the present invention is clearly shown.

Figure 1:
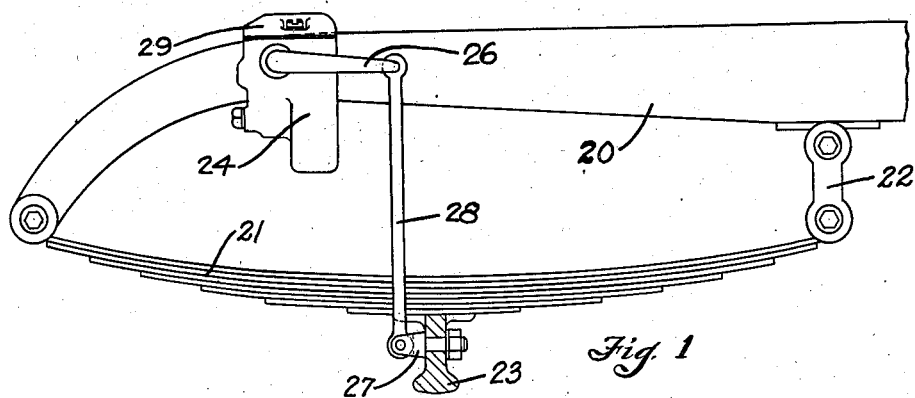
Fig. 1 illustrates the front portion of the frame of an automobile supported by a spring upon the usual axle with the shock absorber, embodying the present invention, applied thereto.

Referring to the drawings, the numeral 20 designates the main girder or side frame of the vehicle, having a downwardly bent end to which one end of a spring 21 is pivotally secured. The other end of said spring 21 is attached to the frame 20 by a link 22 in the usual manner. Intermediate its ends, spring 21 rests upon the axle 23.

The shock absorber is secured to the side frame of the vehicle and comprises a casing 24 having journalled therein a rock shaft 25, to which is secured a relatively long arm or lever 26. A bracket 27 secured to the axle 23 is connected with the lever 26 by a rod 28, the ends of which are swivelly secured to the lever 26 and bracket 27 respectively.

The casing 24 preferably is attached directly to the frame 20, lugs (not shown) being formed on the casing for attaching purposes.

A cover 29, provided with a gasket 30, is held in sealing engagement with the casing by screws 31. The casing 24 provides a fluid chamber 32 divided into two compartments by a partition wall 35, said compartments presenting adjacent cylinders 33 and 34, the cylinder 33 being longer than the cylinder 34.

Pistons 36 and 37 are reciprocally mounted in the cylinders 33 and 34 respectively. The head of the piston 36 has an opening 36ª bridged by a lug 38 to which is connected one end of link 39. The other end of said link 39 is secured to the end of a rocker arm 41, formed on a hub portion 40 which is secured to the rock shaft 25 by a set screw 40ª so as to rotate therewith.

The piston 36 is provided with a check valve comprising a valve seat member 42 having a flange which is held in engagement with the inner surface of the piston head by a spring 43, which is interposed between said valve seat member 42 and the bottom end of cylinder 33. The valve seat member 42 has a plurality of apertures 44 arranged in a circular row about a central portion to which is secured a pin 45. A valve plate member 46 is slidably carried by said pin 45 and held in normal engagement with the valve seat member by a spring 47 surrounding pin 45, one end of said spring 47 engaging the valve plate member 46, the other end resting upon an abutment member 48 retained upon the pin 45 by a C-washer 49. The skirt of the piston 36 has two apertures 50 in superposed relation, said apertures being adapted, when moved in alignment with the through-passage 51 in the partition 35, to complete communication between the cylinders 33 and 34.

Figure 2:
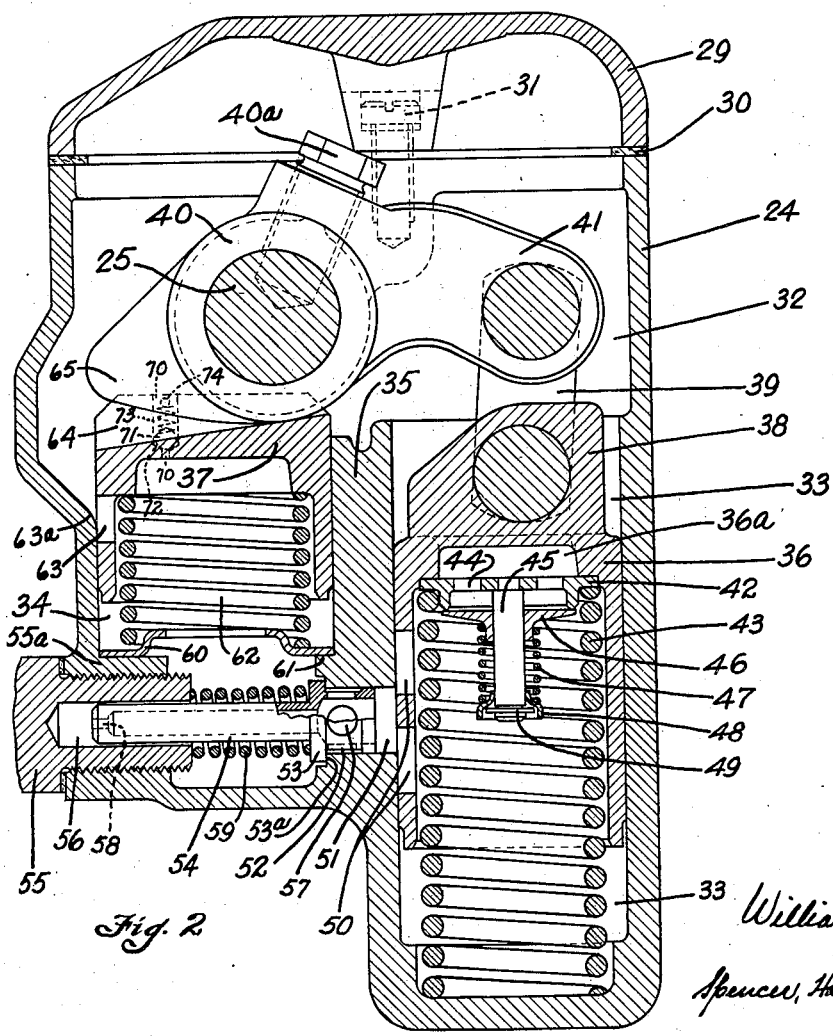
Fig. 2 is a vertical sectional view of the shock absorber, certain portions therein being shown in elevation for the sake of clearness.

The flow of fluid from one cylinder to the other, through passage 51 is controlled by a spring loaded, unbalanced valve comprising a valve stem 54 one end of which is slidably supported in the recess 56 of a plug 55. Said plug 55 is screw threaded into a boss 55ª formed in the side wall of the casing 24 so that the plug 55 is in coaxial alignment with the through-passage 51. The diameter of the valve stem 54 is somewhat less than the diameter of recess 56 for reasons to be given. A flange formed on the valve stem 54 provides a valve member 53 adapted to be held in yielding engagement with a valve seat 53ª formed in the partition 35 about the through passage 51. Spring 59 surrounds the valve stem 54 and is interposed between the end of the plug 55 and the valve member 53. A tubular extension 52 provided with apertures 57, is slidably supported in the through-passage 51. As shown in Fig. 2, the valve stem is hollow throughout the major portion of its length, however, a small orifice 58 is provided at the end extending into the recess 56 through which fluid from the valve stem 54 may flow into the recess 56 and then from said recess into the cylinder 34 due to the difference of diameters between the recess 56 and valve stem 54.

The partition 35 has a ledge 61 formed thereon, said ledge cooperating with the boss 55ª to provide a seat within the cylinder 34, for the abutment plate 60. One end of a spring 62 rests upon the abutment plate 60, the other end of said spring supports the piston 37. In the skirt of the piston 37 and slightly below the piston head, there is provided an aperture 63 which normally provides communication between the fluid chamber 32 and the interior of the cylinder 34 beneath the piston 37. A portion 63ª of a wall of the casing is positioned adjacent the aperture 63 so as to gradually cover said aperture and provide a gradually increasing restriction to the flow of fluid through said aperture as the piston 37 is moved downwardly.

A transverse slot or groove 64 formed in the outer surface of the head of piston 37 receives a cam 65 formed on the hub 40 of the rocker arm 41, thus preventing the piston from turning in its cylinder and consequently maintaining alignment of the aperture 63 with its cooperating casing wall.

As stated in the objects of the invention paragraph, the present device is designed to control the relative movement between the vehicle frame and springs for purposes of minimizing shocks to the vehicle body. While the vehicle is being operated over a comparatively smooth road, the springs 21 will function to absorb shocks which result from slight irregularities in the road bed. However, when the road wheels of the vehicle strike a comparatively larger obstruction, the axle 23 will be forced upwardly toward the frame of the vehicle which flexes the springs 21 in the same direction. The springs, after reaching their limit of flexure, will rebound, however, the frame and body, having been started in an upwardly direction by the spring pressure, will tend to continue in the upward direction until gravity and returning spring action cause a sudden reversal of body movement. Such a sudden reversal causes jarring shocks to the occupant of the vehicle. In the present device when a spring 21 is moved a substantial distance toward the vehicle frame by reason of the road wheels striking a substantial obstruction, the rod 28 will move the lever 26 in a direction to rotate the rock shaft 25 counter-clockwise as viewed in the drawings. Such movement of the rock shaft 25 will cause the cam 65 to move the piston 37 downwardly into its cylinder 34 against the action of the spring 62 and the rocker arm 41 will, through the medium of links 39, move piston 36 upwardly in its cylinder 33. The upward movement of piston 36 causes the fluid in the fluid chamber 32 to move the valve plate 46 away from its seat member 42 against the action of spring 47. A free flow of fluid from the fluid chamber 32 to the interior of the cylinder 33 beneath the piston 36 is now established through passages 44. The downward movement of piston 37 compresses the fluid and spring beneath it, the degree of such compression being dependent upon the extent and suddeness of the downward movement of the piston 37. If the downward movement of the piston is slight due to comparatively slight axle movement toward the frame, the compression of the fluid beneath the piston will be of comparatively small degree inasmuch as the partially closed aperture 63 will provide for a substantial flow of fluid from the cylinder 34 to the fluid chamber 32. However if the axle 23 is moved suddenly and for a substantial distance toward the frame 20, the piston 37 will be moved into its cylinder 34, thereby substantially closing the aperture 63. The compression of the fluid under these circumstances will resist the piston movement downwardly and cause the device to function as a bumper. The fluid pressure resistance to the downward movement of the piston 37 is, however, slightly relieved by the leakage of fluid from cylinder 34 to cylinder 33 through the recess 56, orifice 58, valve stem 54 and through-passage 51. From this it may be seen that the present device provides a resistance to the flexing of the springs 21 which resistance increases more rapidly as the springs approach their limit of flexure.

As has been mentioned heretofore, the frame 20, with the body of the vehicle supported thereon, will tend to move upwardly after the spring 21 commences to move toward its normal unflexed position. The separation of the frame and axle causes the rod 28 to move the lever in a direction to rotate the rock shaft 25 clockwise, as viewed in the drawings, thereby causing the rocker arm 41 and its link 39 to move the piston 36 downwardly. The fluid under pressure beneath the piston 36 closes the valve 46 after which the fluid will flow through the through-passage 51, valve stem 54, orifice 58 into recess 56 and then between the valve stem 54 and the wall of the recess 56 into the cylinder 34. A substantial resistance to the downward movement of the piston 36 obtains due to the restriction at the orifice 58. When a predetermined high fluid pressure is attained within the cylinder 33, the valve member 53 will be moved from its seat 53ª against the resisting pressure of spring 59. The movement of the valve member 53 away from its seat 53ª, moves the tubular extension 52 so that its apertures 57 provide communication between the through-passage 51 and the cylinder 34, thus providing a by-pass around the orifice 58 for relieving the excessive fluid pressure within the cylinder 33. A predetermined pressure is necessary to open the valve 53 against the resistance of spring 59, however, after the valve has been opened, the pressure can be substantially diminished before the valve 53 will again close, due to the increased area of the valve subjected to the fluid pressure when the valve is open. The fluid pressure resisting the movement of the piston 36 downwardly into its cylinder will retard the movement of separation of the axle 23 and frame 20 in accordance with the deflection of spring 21, said retardation tending to dissipate the rebound shock which results from sudden separation of said axle and frame.

The head of the piston 37 is provided with a passage 70 which is normally closed by a spherical relief valve 71 yieldingly maintained on its seat 72 by a spring 73 which is held in position by pin 74 extending into the passage 70. When the acceleration of the relative approaching movement of the frame and axle exceeds a certain amount, thereby causing an abnormal pressure to exist below the head of the piston 37, the relief valve 71 will open to relieve this pressure and thereby prevent undue strains upon the shock absorber.

While the form of embodiment of the present invention as herein disclosed, constitutes a preferred form, it is to be understood that other forms might be adopted, all coming within the scope of the claims which follow.

What is claimed is as follows:

1. A shock absorber for cushioning the movement of two relatively movable members, comprising in combination, a casing adapted to be secured to one of said members, presenting a fluid chamber and cylinders; pistons reciprocal in said cylinders; means connected to the other relatively movable member and adapted to operate each of said pistons in one direction; an aperture through the skirt of the one piston, so positioned relatively to a wall of the casing as to be gradually covered by said wall in response to the movement of said piston by the aforementioned means whereby the flow of fluid through said aperture is gradually, increasingly restricted; and a valve in the other piston for establishing a free flow of fluid therethrough during said movement of the first mentioned piston.

2. A shock absorber for cushioning the movement of two relatively movable members, comprising in combination, a casing adapted to be secured to one of said members, presenting a fluid chamber and cylinders; pistons reciprocal in said cylinders; means connected to the other relatively movable member and adapted to operate each of said pistons in one direction; and a valve interposed between the cylinders and adapted to provide a variable resistance to the flow of fluid from the one cylinder to the other when the piston of the one cylinder is operated by the said means, said valve providing a restricted, constant flow passage for the fluid escaping from the said other cylinder to the first mentioned cylinder when the piston in said other cylinder is operated by said means.

3. A shock absorber for cushioning the movement of two relatively movable members, comprising in combination, a casing adapted to be secured to one of said members, presenting a fluid chamber and cylinders; pistons reciprocal in said cylinders; means connected to the other relatively movable member and adapted to operate each of said pistons in one direction; fluid controlling means for establishing a gradually, increasing restricted flow of fluid through the one piston in response to the movement of said piston by its operating means; and a valve interposed between the cylinders and adapted to provide a restricted constant flow relief passage for the flow of fluid from the cylinder of the said one piston to the other cylinder, said valve providing a variable resistance to the flow of fluid from the said other cylinder to the first mentioned cylinder in response to the downward movement of the piston in said other cylinder.

4. A shock absorber for cushioning the movement of two relatively movable members, comprising, a casing adapted to be secured to one of said members presenting a fluid chamber and cylinders; pistons reciprocal in said cylinders; a rock shaft journalled in said casing and operatively connected to the other relatively movable member, said rock shaft having arms within the casing which engage the piston to operate each of them in one direction; means for establishing a free flow of fluid from the fluid chamber through the one piston into its respective cylinder in response to the movement of the two relatively movable members toward each other; and an aperture through the skirt of the other piston directly beneath its head portion for establishing a gradually increasing restricted flow of fluid through the said other piston in response to said movement of the two relatively movable members.

5. A shock absorber for cushioning the movement of two relatively movable members, comprising, a casing adapted to be secured to one of said members, presenting a fluid chamber and cylinder; pistons reciprocal in said cylinders; means operatively connected to the other of said relatively movable members and engaging the pistons alternately to operate them in the same direction in response to movement between the relatively movable members; means in the one piston to establish a free flow of fluid from the fluid chamber through said piston into the cylinder thereof in response to approaching movement of the said members; and an aperture in the skirt of the other piston, directly beneath the piston head portion for establishing a gradually increasing restricted flow from the inside of said piston through the aperture to the fluid chamber in response to the said movement of said members, whereby gradually to resist said movement.

6. A shock absorber for cushioning the movement of two relatively movable members comprising, a casing adapted to be secured to one of said members presenting a fluid chamber and two cylinders; a piston reciprocal in each of said cylinders; a rock shaft journalled in said casing and operatively connected to the other relatively movable member, said rock shaft having arms within the casing which engage the pistons for operating one or the other piston into its cylinder in response to the movement of said members toward or away from each other; an opening through the skirt of the one piston, gradually covered by the movement of the said one piston for gradually restricting the flow of fluid from the cylinder beneath said piston through the opening in its skirt to the fluid chamber upon movement of the relatively movable members toward each other; means in the other piston for establishing a free flow of fluid from the fluid chamber into the cylinder beneath said piston during the said movement of said members; and means comprising a valve interposed between the two cylinders and having one constantly open passage for delivering fluid from the one cylinder to the other at a restricted flow when either piston is moved into its cylinder.

7. A shock absorber for cushioning the movement of two relatively movable members comprising, a casing adapted to be secured to one of said members presenting a fluid chamber and two cylinders; a piston reciprocal in each of said cylinders; a rock shaft journalled in said casing and operatively connected to the other relatively movable member, said rock shaft having arms within the casing which engage the piston for operating one or the other piston into its cylinder in response to the movement of said members toward or away from each other; means controlled by the movement of the one piston for establishing a gradually restricted flow of fluid from the cylinder beneath said piston to the fluid chamber upon movement of the relatively movable members toward each other; means in the other piston for establishing a free flow of fluid from the fluid chamber into the cylinder beneath said piston during the said movement of said members; and a resiliently actuated unbalanced valve providing communication between the cylinder portions beneath the pistons, said valve being adapted to establish a variably restricted flow of fluid from one cylinder into the other and a constantly restricted flow in the reverse direction.

8. A shock absorber for cushioning the movement of two relatively movable members comprising, a casing adapted to be secured to one of said members, presenting a fluid chamber and two cylinders; a piston in each cylinder; a rock shaft journalled in the casing and operatively connected to the other of said movable members; a rocker arm secured on the rock shaft within the casing, said rocker arm having a cam portion engaging the one piston for moving it into its cylinder when the two relatively movable members are moved toward each other; links connecting the rocker arm with the other piston; a valve in said last mentioned piston for establishing a free flow of fluid from the fluid chamber to the cylinder portion beneath said piston when the said movable members are moved toward each other; means provided by the other piston for establishing a gradually increasing restriction to the flow of fluid from beneath said piston to the fluid chamber during the said approaching movement of said members, for gradually resisting said movement; and a spring loaded, relief valve providing communication between the two cylinders for variably restricting the flow of fluid from the one cylinder to the other when the one piston is moved into its cylinder by the separating movement of the two relatively movable members, said relief valve providing a restricted, constant flow bleeder passage from the cylinder in which the fluid is compressed by the approaching movement of the relatively movable members, to the adjacent cylinder.

In testimony whereof I hereto affix my signature.

WILLIAM A. CHRYST.